J. C. CARR.
ROAD-ENGINES.

No. 195,702.   Patented Oct. 2, 1877.

Attest.
J. Geo. Morton.
Chas. S. Grubb.

Inventor.
John C. Carr.

UNITED STATES PATENT OFFICE.

JOHN C. CARR, OF LOGAN COUNTY, KENTUCKY.

IMPROVEMENT IN ROAD-ENGINES.

Specification forming part of Letters Patent No. 195,702, dated October 2, 1877; application filed January 27, 1877.

*To all whom it may concern:*

Be it known that I, JOHN C. CARR, of the county of Logan and State of Kentucky, have invented a new and Improved Engine-Carriage, to be run by steam on plank, pike, or dirt roads; and I hereby declare that the following is a full, clear, and exact description of the same, reference being had to the accompanying drawing, forming a part of this specification.

The carriage runs on four wheels, the front wheels being smaller and narrower, whose function is to support the front end of the carriage and to guide it.

Figure 1:
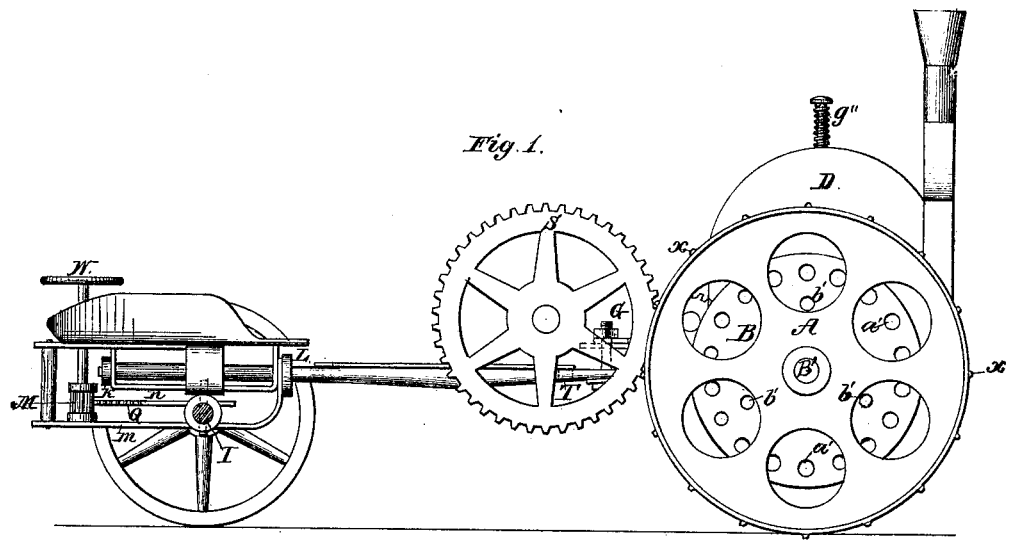
Figure 2:
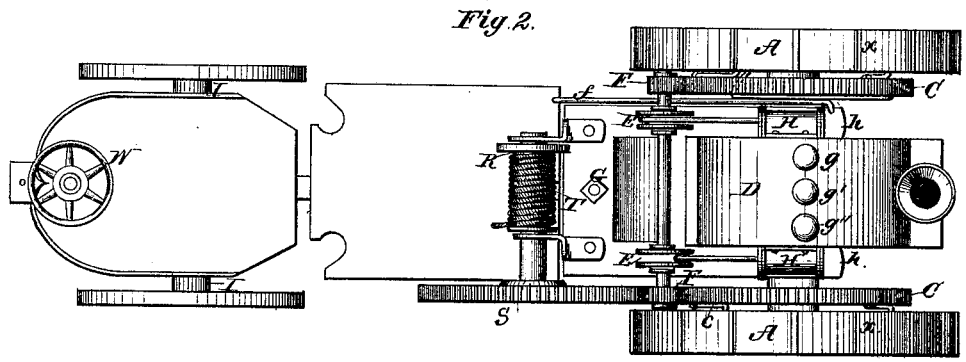
Figure 3:
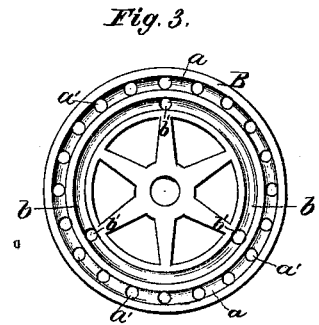
Figure 4:
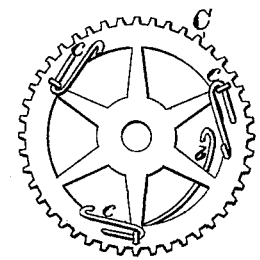

In the drawing, Figure 1 represents a side elevation of the carriage. Fig. 2 is a top-plan view of the same. Fig. 3 is a view of the circular plate or rim which is bolted to the rear wheels of the carriage, and Fig. 4 is a view of the cog-wheel which is secured to the axle on the inner sides of the rear wheels.

A is one of the rear wheels, having a tread from six to twelve inches wide, with cross-catches $x$ $x$ on it. B is a circular plate or rim, having a diameter about two-thirds of that of A, and permanently bolted to it; or, if the rear wheel A is cast solid, B will be part of it. It is bolted on or forms part of the rear wheel on the inner side. Near the circumference there is a groove, $a$ $a$, along which, at regular and close intervals, are holes $a'$ $a'$. An inner groove, $b$ $b$, has three slots, $b'$ $b'$ $b'$, equally distant from each other. The wheel A and attached plate B revolve on the axle $B'$.

C is a cog-wheel having the same diameter as the circle B, and is fastened permanently on the axle, on the inner side of the wheel A. The axle passes through the boiler D. The cylinders H H of the engine, working on each side, turn the engine-shaft E, on each end of which is a small cog-wheel, F, working in and turning the wheel C. As the wheel C is turned by the engine the hooks $c$ $c$ $c$ catch in the holes $a'$ $a'$ $a'$, and thus the wheel C and rear drive-wheel are clutched together, and they move as if they were one wheel. When it is desired to reverse the motion of the rear wheel, the hooks $c$ $c$ drop out of the holes $a'$ $a'$, and slide along the groove $a$ $a$, leaving the wheel A to revolve on the axle, unaffected by the continuing revolution of the wheel C till the hooks $b$ $b$, (which are fastened to the rim of the wheel C, on the side opposite to the hooks $c$ $c$,) pressed out by the bar or lever $f$, fall into the slots $b'$ $b'$, thus fastening the plate B to the gear-wheel and turning it backward.

The boiler D, made steady on the bed by flanges $h$ $h$ on each side, has its sides next to the wheels, forming a circular top. The three water-gages $g$ $g'$ $g''$ are set in the top of the boiler, perpendicular to its axis, and are of different lengths. As the carriage is to run up and down hill, the rounding of the top of the boiler will keep the water deeper on the flues at the elevated end of the boiler; and the gages, by penetrating to different depths over the axis of the tilting movement of the water, keep a measure of the supply, which side or end gages could not keep.

The coupling G is branched, and the two branches are secured behind to the carriage-bed by bolts passing through the bed, bearings for the axle, and coupling-branches. The fore part of the coupling is round, and about it the guide-wheels, with their fixtures, may partially revolve, thus: The guide-wheels turn on the axle I I. This axle passes between the bars $m$ and $n$, and moves readily to the right or left on a pivot passing through $n$ (the axle) and $m$. The bars are held in place by the shoulders L and $k$ on the coupling, which itself is a pivot on which the bars $m$ (at $k$) and $n$ (at L) turn. By this means one guide-wheel may run on higher or lower ground than the other. To facilitate this the carriage-bed is made of two pieces, the fore part of it extending a little back of the shoulder $k$, and is raised a little above the rear part, so as to lap over it when turning.

In order to keep the water in the boiler as near level as possible, the coupling G is somewhat depressed toward the front of the rear carriage-bed, which rests on and is secured by a strong screw, by which that end of the bed on which the boiler rests may be raised in descending, and lowered in ascending, a hill.

In the front of the boiler there is placed a derrick, the driving-wheel S of which is geared in the cog-pinion F, and the rope wound on the drum R may be fastened to a tree or other fixed object, and the carriage may be pulled up. By passing the rope through the opening T and backward over a pulley under the engine, the freight-carriage may, if necessary, be pulled up.

A cog-pinion, M, operated by the hand-wheel W, works the half-wheel Q, which, being fastened to the axle I I, turns the guide-wheels right or left, as desired.

The engine shaft and cylinders may be reversed, the shaft being behind the boiler, and the derrick may also be placed behind the boiler. The pinion and hand-wheel, working the guide-wheels, may also be placed behind the axle.

What I claim is—

1. The combination of the wheel A, perforated plate B, hooks $c$, gear-wheel C, and pinion F upon the crank-shaft E, the whole constructed and arranged substantially as and for the purpose set forth.

2. The apparatus employed for propelling the carriage, consisting of the wheels A and the devices by which they are connected with the engine-shaft E, in combination with the auxiliary mechanism, consisting of driving-gear S, rope and windlass R, substantially as specified.

3. The coupling-shaft provided with collars L $k$, in combination with the supporting-plates $m$ and $n$, segment-gear Q, and pinion M, arranged to give a free oscillatory movement to the guiding-wheels upon the coupling-shaft, and, at the same time, allow the guiding devices to be freely operated, substantially as specified.

JOHN C. CARR.

Witnesses:
J. CASS MORTON,
CHAS. S. GRUBB.